(12) United States Patent
Holcombe et al.

(10) Patent No.: US 8,803,096 B2
(45) Date of Patent: Aug. 12, 2014

(54) METHOD AND APPARATUS FOR SPECTRALLY-CORRECTED AMBIENT LIGHT SENSOR

(75) Inventors: Wayne T. Holcombe, Mountain View, CA (US); Miroslav Svajda, San Jose, CA (US)

(73) Assignee: Silicon Laboratories Inc., Austin, TX (US)

( * ) Notice: Subject to any disclaimer, the term of this patent is extended or adjusted under 35 U.S.C. 154(b) by 950 days.

(21) Appl. No.: 12/894,906

(22) Filed: Sep. 30, 2010

(65) Prior Publication Data

US 2011/0248170 A1 Oct. 13, 2011

Related U.S. Application Data

(60) Provisional application No. 61/323,798, filed on Apr. 13, 2010.

(51) Int. Cl.
*G01J 1/44* (2006.01)

(52) U.S. Cl.
CPC .......................................... *G01J 1/44* (2013.01)
USPC ....................................................... 250/340

(58) Field of Classification Search
CPC ........................................................ G01J 1/44
USPC ................................ 250/340, 338.1, 214 AL
See application file for complete search history.

(56) References Cited

U.S. PATENT DOCUMENTS

| 4,214,264 A | 7/1980 | Hayward et al. |
| 4,437,112 A | 3/1984 | Tanaka et al. |
| 4,473,797 A | 9/1984 | Shiota |
| 4,651,001 A | 3/1987 | Harada et al. |
| 4,660,075 A | 4/1987 | Hashimoto et al. |
| 4,677,289 A | 6/1987 | Nozaki et al. |
| 5,502,299 A | 3/1996 | Standley |
| 5,701,010 A * | 12/1997 | Martin ...................... 250/370.06 |
| 5,965,875 A | 10/1999 | Merrill |
| 6,034,406 A | 3/2000 | Kobayashi et al. |
| 6,596,981 B1 | 7/2003 | Aswell et al. |
| 6,982,406 B2 | 1/2006 | Chen |
| 7,166,880 B2 | 1/2007 | Merrill et al. |
| 8,350,208 B1 * | 1/2013 | Zhang et al. ............... 250/214.1 |
| 8,395,324 B2 * | 3/2013 | Bilenko et al. ................ 315/152 |
| 8,405,030 B2 * | 3/2013 | Rueger et al. .............. 250/338.1 |
| 2010/0060611 A1 | 3/2010 | Nie |

(Continued)

OTHER PUBLICATIONS

U.S. Patent and Trademark Office, Office Action mailed Jul. 10, 2013 with Reply filed Oct. 4, 2013 in U.S. Appl. No. 12/826,947.
U.S. Patent and Trademark Office, Final Office Action mailed Oct. 30, 2013 with Reply filed Dec. 30, 2013 in U.S. Appl. No. 12/826,947.
I. Takayanagi, et al., "A Low Dark Current Stacked CMOS-APS for Charged Particle Imaging," Dec. 2-5, 2001, 4 pages.

(Continued)

*Primary Examiner* — David Porta
*Assistant Examiner* — Faye Boosalis
(74) *Attorney, Agent, or Firm* — Trop, Pruner & Hu, P.C.

(57) ABSTRACT

In one embodiment, a method includes receiving outputs from multiple photodetectors, calculating a first ratio between first and second such outputs, calculating a second ratio between the first output and a difference corresponding to a flicker noise component obtained from the second output, and determining a contribution from multiple illumination types based at least in part on the first and second ratios. The method may also include obtaining multiple correction coefficients based at least in part on the determined contribution, and in turn determining an ambient light type present in proximity to the photodetectors using the correction coefficients and the first and second outputs.

19 Claims, 5 Drawing Sheets

(56) References Cited

U.S. PATENT DOCUMENTS

2010/0289755 A1  11/2010  Zhu et al.
2011/0210257 A9* 9/2011  Handique et al. ............. 250/366
2012/0001841 A1  1/2012  Gokingco

OTHER PUBLICATIONS

P. Catrysse, et al., "An Integrated Color Pixel in 0.18 um CMOS Technology," 2001, 4 pages.
K.M. Findlater, et al., "A CMOS Image Sensor Employing a Double Junction Photodiode," 2001, 3 pages.

* cited by examiner

METHOD AND APPARATUS FOR SPECTRALLY-CORRECTED AMBIENT LIGHT SENSOR

This application claims the benefit of U.S. Provisional Patent Application No. 61/323,798 filed on Apr. 13, 2010, entitled APPARATUS WITH OPTICAL FUNCTIONALITY AND ASSOCIATED METHODS.

BACKGROUND

The disclosed concepts relate generally to electronic apparatus. More particularly, the disclosed concepts relate to apparatus having optical functionality, related systems, and associated methods.

Many consumer electronic devices include displays such as liquid crystal displays or light emitting diode displays that implement some type of backlight source. In general, these displays can consume a great amount of power, particularly in the realm of portable devices such as cellular telephones, portable digital assistants, videogames and so forth. In addition, many of these same devices include a reflectance-based proximity sensor.

To reduce power consumption in such devices, attempts are made to provide a detection mechanism to detect ambient light conditions to aid in determining an appropriate amount of illumination to be provided by the display based on an environment in which the display is located. Such a detector can be implemented using a high quality photodetector that is closely matched to a human photopic response. This optical processor can be integrated with a reflectance proximity sensor which can be used in many display applications to support various display and touch sensor inputs, enabling and disabling them as appropriate to reduce power and prevent spurious inputs (such as disabling the touch display when a cell phone is held to the head).

SUMMARY OF INVENTION

One aspect of the present invention is directed to an apparatus that includes a dual photodetector having a first detector configured for a visible light spectrum and a second detector configured for an infrared light spectrum. In addition, a selector is coupled to an output of the photodetectors, and an analog-to-digital converter (ADC) is coupled to the selector. In one embodiment, this ADC can have a bipolar input to receive a current of a first polarity and a current of a second polarity from the selector, where the current of the first polarity is received from the second photodetector and the current of the second polarity is received from the first photodetector. The dual photodetector may have a stacked structure in which the first and second photodetectors are coupled at a common node and one of the photodetectors is stacked above the other photodetector on a co-located portion of a semiconductor die.

In another aspect of the present invention, a method can be performed that uses such an apparatus. In one embodiment, the method can include receiving first and second outputs from the corresponding photodetectors, calculating a first ratio between the first and second outputs, calculating a second ratio between the first output and a difference corresponding to a flicker noise component obtained from the second output, and determining a contribution from multiple illumination types based at least in part on the first and second ratios. Further, the method may also include obtaining multiple correction coefficients based at least in part on the determined contribution, and in turn determining an ambient light type present in proximity to the photodetectors using the correction coefficients and the first and second outputs.

A still further aspect of the present invention is directed to a portable device that includes, in one embodiment, a processor to perform application program instructions, a transceiver to transmit and receive radio frequency (RF) signals, a display to display information to a user, a dual photodetector structure and a controller coupled to the dual photodetector structure.

In one embodiment, this dual photodetector structure can have multiple photodetectors to detect energy in different spectra, a switching circuit to control coupling of a selected one of the photodetectors to a selection circuit, and an ADC coupled to the selection circuit to receive and convert currents of different polarities received from different selected photodetectors. In one embodiment, the controller can receive digitized information regarding the currents and determine an ambient light type based on a photopic illumination value calculated using at least one correction coefficient obtained based at least in part on the currents.

DETAILED DESCRIPTION

Embodiments may be used to provide proximity detection and ambient light detection in an environment in which an optical sensor is located. As will be discussed below, to account for inaccuracies in the sensor, various processing can be performed on the sensor outputs to reliably determine an ambient light type present in the environment.

In some embodiments, the optical sensor may be implemented in a sensor IC that is coupled to a host processor by a host interface. In some embodiments, the host processor and the sensor IC may be integrated within a single semiconductor die. The integration of the host processor and the sensor IC (whether on a single die, within a multi-chip module (MCM), etc.) may provide for higher speed, lower cost, etc., as persons of ordinary skill in the art who have the benefit of the description of the disclosed concepts understand.

In one exemplary embodiment, a sensor IC performs optical reflectance proximity, motion, and ambient light functions with high sensitivity and reduced, optimized, and/or minimal power consumption. In exemplary embodiments, the IC provides a host processor with digital measurements of light energy as sensed by on-chip photodiodes through a transparent IC package. In exemplary embodiments, proximity and motion are measured by illuminating one or more external infrared LEDs and sensing the reflected infrared light, and ambient light is measured by sensing incident infrared and visible light and optionally applying photopic correction. In exemplary embodiments, relatively high sensitivity is achieved by a direct coupling of the photodetectors to a delta-sigma analog-to-digital converter (ADC), having relatively high-resolution, via a multiplexer (MUX), and using per-measurement calibration, as desired. In one embodiment, the ADC is a current-input incremental-mode second-order delta-sigma modulator. A color filter may be provided for one of the photodetectors, although in other embodiments this filter may not be present. The sensor IC may include a flexible programmable controller to coordinate the operations of the various blocks of the sensor IC. In exemplary embodiments, it receives commands from the host interface, configures and enables various components of the IC, and sends data to the host processor via the host interface.

A typical junction silicon photodiode in a substrate has a wide spectral response, with a peak in the infrared spectrum. Thus, by using an infrared light source as the stimulus for proximity detection or measurement, one may increase sensitivity.

Figure 1:
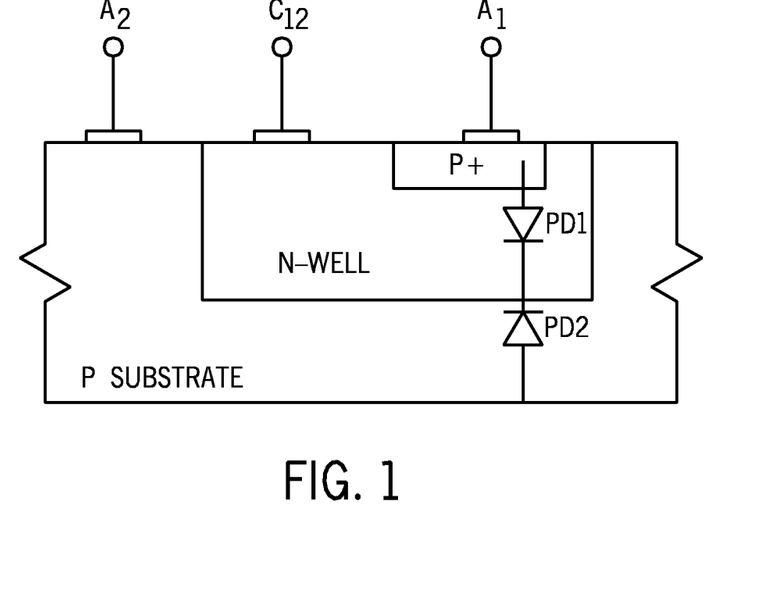
FIG. 1 is a schematic diagram of a dual photodetector in accordance with an embodiment of the present invention.

In one exemplary embodiment, a dual-junction vertical semiconductor p/n/p stack is used for photodetection, as shown in FIG. 1, which is a schematic diagram of a dual photodetector in accordance with an embodiment of the present invention. An upper p/n junction PD1 (p-active to n-well) is relatively shallow, and responds mainly to visible light spectrum. A bottom n/p junction PD2 (n-well to p-substrate) responds mostly to infrared light spectrum. PD1 is used to measure visible light for ambient light mode (ALS). PD2 is used mainly for proximity mode (PS) but also for optional spectral correction of ALS. PD1 and PD2 may be implemented as a plurality of vertical structures. In many embodiments, a multiplexer can select an appropriate detector for each measurement mode (two identical structures with different optical areas are used in an exemplary embodiment).

If the infrared signal photodiode is constructed from a continuous Nwell in P substrate but also has a shorted P diffusion in the Nwell, the Nwell to P substrate diode will have relatively strong infrared response with a reduced visible component, especially if the Nwell is relatively deep (for example, on the order of 3 microns). Since the light absorption depth increases with wavelength, the shorter visible wavelengths get absorbed near the surface in the Nwell and the carriers get collected by the shorted P diffusion on top of the Nwell, while the longer wave infrared penetrates and get absorbed in the substrate, and the resulting carriers get collected by the Nwell. This diode structure can reduce the visible component response that leaks through the infrared filter by one half. In exemplary embodiments, the controller may be used to correct the spectral responses of the infrared and visible light diodes to provide a photopic correction that more closely matches human eye response, as will be discussed below.

Because silicon photodiodes do not have the same response to light as the human eye, ambient light sensors are typically filtered to mimic a normalized human eye (photopic) response. However, such filters use multiple photosensors and multiple color overlaid optical filters, thus increasing cost.

Embodiments may use a single Psub/Nwell/Pdiff structure to form a built-in dual vertical photodiode to enable relative area efficiency and avoid use of an additional optical filter. In general in various embodiments, photopic correction can be achieved by detecting the type of dominant light source and applying appropriate canceling coefficients for the light source.

Thus in exemplary embodiments, a dual photodiode structure can be formed by a vertical Pdiff/Nwell/Psub structure. The first photodiode is at the Pdiff/Nwell junction and the second photodiode is at the Nwell/Psub junction. The first diode (which may be at a relatively shallow depth in exemplary embodiments, less than 1 um) can have a peak spectral response in the visible light spectrum, ~500-600 nm. The second diode (which may be at a relatively deep depth in exemplary embodiments, around 1 um) can have a peak spectral response in the near infrared light spectrum, ~700-900 nm.

Figure 2:
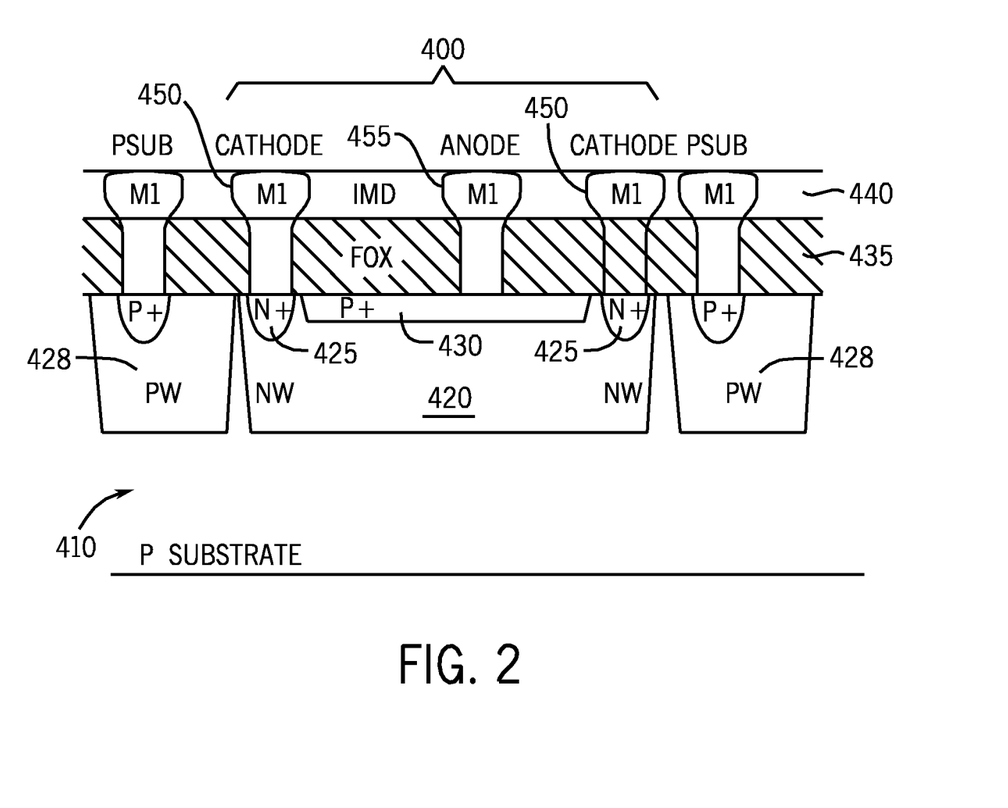
FIG. 2 is a cross-sectional view of a dual photodetector structure in accordance with an embodiment of the present invention.

Referring now to FIG. 2, shown is a cross-sectional view of a dual photodetector structure in accordance with another embodiment of the present invention. As shown in FIG. 2, photodetector 400 is formed of a CMOS process, and more specifically is formed in a substrate 410 which may be of a P-type polarity. The dual photodiodes of photodetector 400 may be implemented by forming a well of an opposite polarity, namely N-well 420 within the P substrate. Various diffusions, e.g., of N+ and P+ ions, into this N-well 400 may occur to form a plurality of N+ regions 425 and a P+ region 430. Then an insulation layer 435 may be deposited. In one embodiment, the silicon oxide layer may be formed of a field oxide on the top of the active silicon for insulation. Then diffusion contacts are formed to connect silicon diffusions to metal interconnects M1. Then an intermetal dielectric layer 440 may be formed. Electrodes corresponding to the anodes 455 and cathode 450 of the respective photodiodes are formed by patterning portions of this layer and oxide layer 435. As further seen, this photodiode structure 400 may be bounded by other portions of a semiconductor device that is formed of different types of wells and implants. As seen, the p-well 428 around n-well 420 electrically isolates the photodetector. While shown with this particular embodiment in FIG. 2, the scope of the present invention is not limited in this regard.

Note that the stacked photodiode of FIG. 2, in which the visible and infrared diodes are stacked on one another (namely the visible light diode stacked on top of the infrared light diode, and having a common node therebetween) may enable the diodes' light output ratios to stay constant in spite of shadowing. If instead separate shallow and deep photodiodes (even with a shorted shallow photodiode on top) were used in which the photodiodes were at different positions on the IC, then shadowing illumination differences may exist between the two photodiodes. As a result, such unstacked photodiodes may lead to significant color correction errors as compared to co-located stacked photodiodes in accordance with an embodiment of the present invention.

In general, photopic correction may be implemented by subtracting the weighted value of the second photodiode output from the first photodiode output, such that the resulting signal will be mainly responsive to visible light and relatively unresponsive to the infrared component. The infrared response of the first photodiode is mostly cancelled by the second photodiode, which is stronger in infrared than for the first diode. Photodiode currents can be subtracted directly or converted to another domain (time, digital) and processed to obtain a desired spectral response to incident light.

Since efficient fluorescent and white LED light sources have relatively small infrared content, but incandescent lighting has as much eight times more silicon infrared response than visible light, and sunlight has about one half response in infrared, it becomes possible to determine the main source of illumination from the ratio of response of the second diode (stronger in infrared) relative to the first diode (stronger in visible). In exemplary embodiments, once the main source of illumination is determined (e.g., by setting thresholds), different optimum canceling coefficients can be used for each light source, producing more accurate photopic results. For example, with incandescent lighting, the second diode will have a higher output relative to the first photodiode, than the other two groups. The sunlight source will be between the values for an incandescent and a fluorescent source.

Errors in photopic response not only arise from different infrared response of second diode versus first diode but also due to differences in visible spectrum shape of black body temperature versus non-black body curve fluorescent emissions, since the visible diode does not have an accurate eye response, and because typically one cannot precisely correct with just two different photodiode response curves. This is the reason that infrared canceling or even filter blocking of infrared alone typically does not overcome all of the photopic response errors. Consequently, in exemplary embodiments, the infrared to visible ratio can be used to identify the appropriate correction coefficients. In this manner, the peak-to-peak photopic error for a wide range of sources can be reduced to relatively low levels, e.g., 15% in exemplary embodiments.

In addition, because light sources from these three groups may be mixed, the infrared to visible or second to first diode response may be ambiguous. A ratio which is the same as all natural (sunlight) may be from a combination of fluorescent and incandescent lighting. However, from these two diodes one may in exemplary embodiments produce a useful infrared illumination signal that has most or a substantial amount of the visible component cancelled by subtracting a fraction of the first diode current from the second diode current.

The presence in incandescent lighting of a flicker noise component which has a frequency equal to twice the AC mains frequency due to the heating time constant of the filament, can also be leveraged in performing photopic corrections. Thus, the flicker noise component has a frequency of 120 Hz on 60 Hz AC mains, and a frequency of 100 Hz on 50 Hz AC mains, and has a peak-to-peak level of about 10%+-2% of the average value of light output including infrared. For a 400Lux (bright office) incandescent lighting, the flicker noise creates an infrared filtered silicon response of about 60 uW/cm2 peak to peak and a peak slew rate of 30 uW/cm2/ms. By measuring the peak-to-peak 100 Hz to 120 Hz flicker noise component on this illumination infrared signal, the ratio of incandescent to sunlight can be determined. Thus the flicker noise, along with the total ratio of infrared to visible, allows in exemplary embodiments the determination of illumination contribution from the three dominant groups: fluorescent/white LED, sunlight, and incandescent. This then allows linear combining of correction coefficients for all three groups. Accordingly, even further accuracy improvements can be realized without additional silicon die-area, since with modern IC processes photodiode silicon area and added filter or specialized processing costs are more than the increased die-area cost for signal processing.

In summary, in exemplary embodiments, the determination of illumination composition by analyzing infrared to visible ratio and flicker noise percentage on the infrared component allows more optimal or improved correction of the visible first diode response both for infrared component and for visible spectrum mismatch with ideal eye response. This is achieved without added costs (or with marginal or relatively small costs) to the relatively efficient stacked dual photodiode structure.

Figure 3:
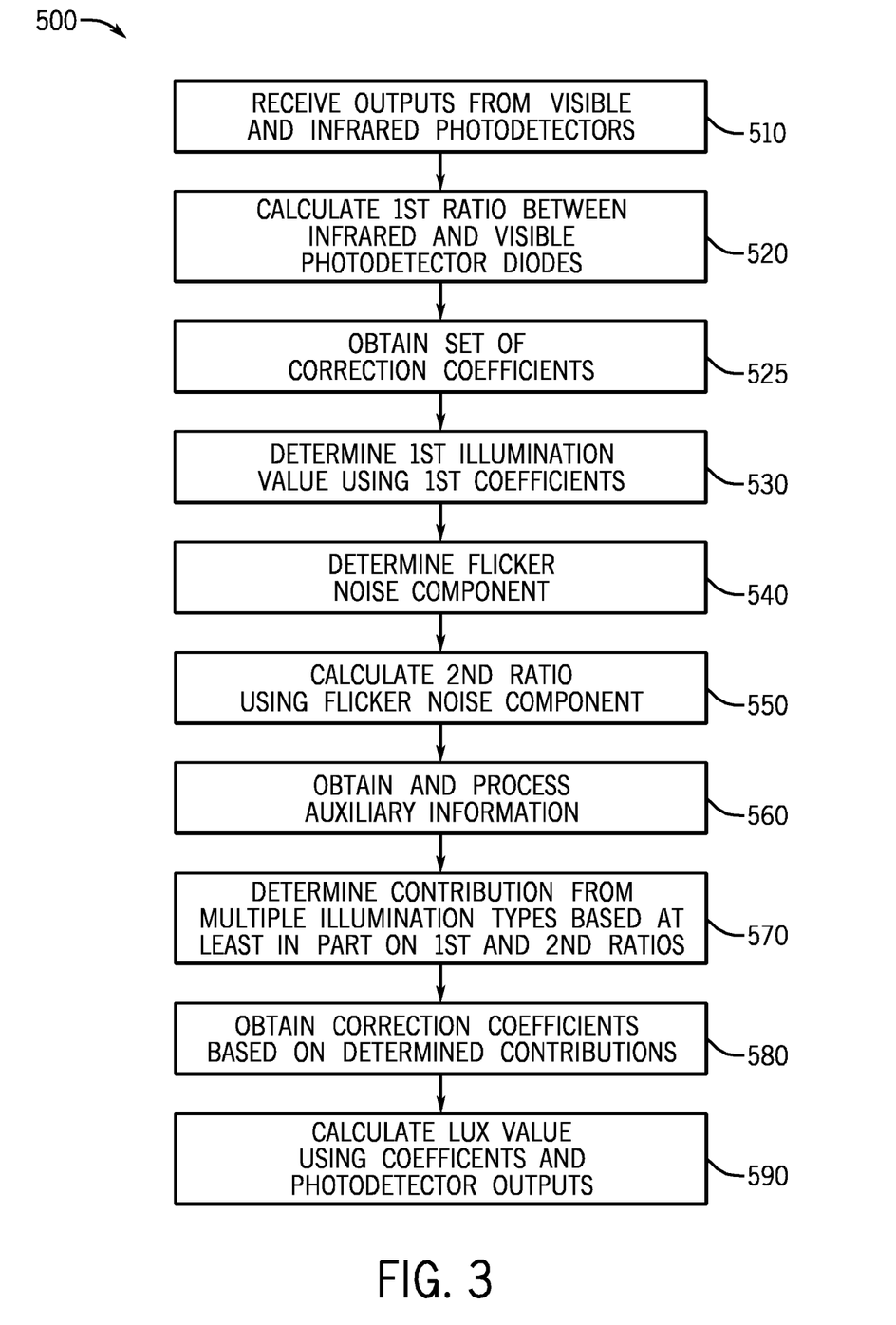
FIG. 3 is a flow diagram of a method in accordance with an embodiment of the present invention.

Referring now to FIG. 3, shown is a flow diagram of a method in accordance with one embodiment of the present invention. As shown in FIG. 3, method 500 may be performed by a controller such as an MCU that may receive various inputs, e.g., from multiple photodetectors as discussed above. As seen, method 500 may begin by receiving outputs from visible and infrared photodetectors (block 510). As discussed above, these outputs may be current values corresponding to a spectral response to received energy in the photodetectors.

Various processing may be performed on the incoming data by the MCU. In general, this processing may include compensations, calculations and determinations to result in an ambient light determination based on, e.g., an illumination or lux value determined using correction factors obtained from the received data. Processing may began by calculating a first ratio (block 520). More specifically, this ratio may be calculated between the infrared and visible photodetector outputs. From this ratio, a set of weighting coefficients may be obtained, e.g., from a lookup table (block 525). Note that these coefficients, used for purposes of correction, may include a spectral correction factor for the infrared detector and a normalization coefficient, which seek to correct a determined illumination value, due to inherent limitations of the photodiodes. As will be discussed below, auxiliary information may be obtained and analyzed to then obtain a different set of correction coefficients, which may provide for greater correction. At block 530, an initial or first illumination value can be determined, e.g., a weighted output of the infrared photodetector can be subtracted from the visible photodetector output (block 530). As discussed further below, this value may be used to aid in determination of the ambient light type.

As mentioned above, in some embodiments auxiliary information may be obtained and processed to aid in determination of a more accurate lux value (block 540). This auxiliary information may include flicker noise information, information from a different photodetector (e.g., an infrared detector having a different spectral response, intensity information, and so forth. However, in some embodiments the lux value determined in block 530 may be sufficient for a desired application, and thus the computations for processing auxiliary information can be avoided.

Still referring to FIG. 3, in some embodiments one such auxiliary information may relate to flicker noise, and thus a flicker noise component of the infrared photodetector output may be determined. That is, as discussed above the infrared photodetector may have a component of its output that corresponds to a flicker noise component inherent in the infrared spectrum, e.g., due to incandescent light sources. While the scope of the present invention is not limited in this regard, in one embodiment this flicker noise component may be measured as a peak-to-peak value of the infrared photodetector output. In one example embodiment, this peak-to-peak value may be at approximately 10% of the RMS infrared photodetector output amplitude.

To determine the flicker noise component, first an illumination infrared signal may be acquired over several periods of time and then a peak-to-peak value is calculated as a difference between the minimum and maximum samples (block 540).

Then based on this determined component, a second ratio may be calculated (block 550). More specifically, the second ratio may be a ratio of incandescent light to sunlight, and may be calculated based on this difference and the output of the visible light photodetector as: Ratio=Vis/IR Then, at block 560, additional auxiliary information may be obtained and processed. Such information may include information from another infrared detector having a different spectral response, intensity information such as the intensity of the lux value determined at block 530, and so forth.

Next, the contribution from multiple illumination types can be determined based at least in part on these ratios and other information (block 570). That is, by using these two ratios and available auxiliary information, the illumination contribution from the three dominant groups (fluorescent/white LED, sunlight, and incandescent) can be determined. Based on this determination of the different illumination types, another set of correction coefficient can be obtained (block 580). More specifically, the different contribution amounts and auxiliary information may be used to access the lookup table or other storage structure in which predetermined coefficient values for different illumination conditions are stored. For example, in one embodiment a combination of the illumination types, e.g., as percentages, may be used as an address to access the lookup table.

Finally, an illumination or lux value, which may be a photopic illumination value, can be calculated using the correction coefficients [a,b] and the photodetector outputs (block 590). While different calculations can be done in different embodiments, in one particular embodiment a lux value may be determined as follows:

$$\text{lux}=a(\text{Vis}-b*\text{IR})$$

where a is a normalization correction coefficient to normalize the output to the lux unit, Vis and IR are the photodetector outputs, and b is a spectral correction coefficient.

Accordingly, based on the calculated lux value, an ambient light type can be determined. That is, based on the lux value a corresponding illumination type results. For example, if a lux value is between a first threshold and a second, higher threshold level, the ambient light type may be determined to be incandescent or indirect sunlight and if greater than the second threshold, the ambient light type is determined to be sunlight conditions.

Figure 4:
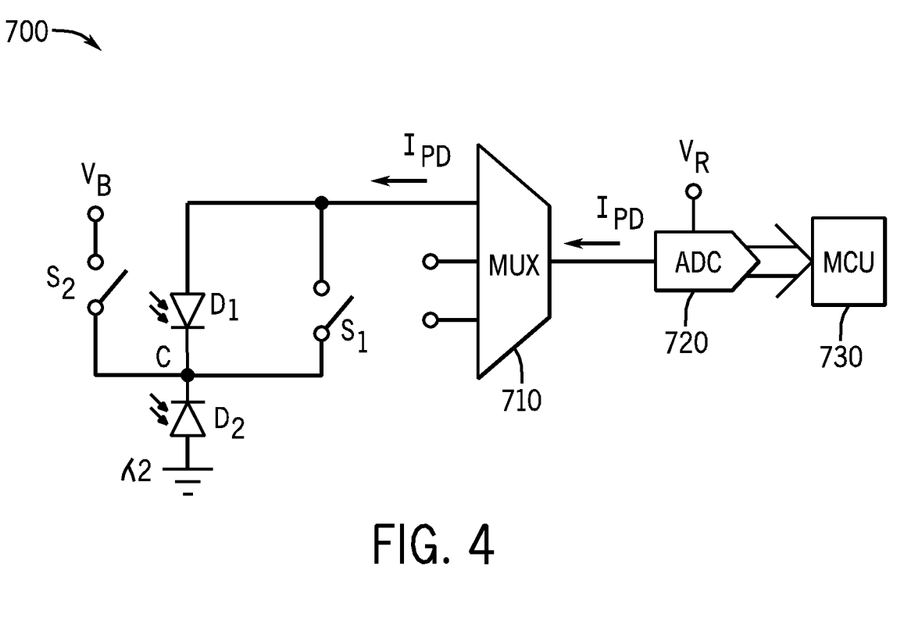
FIG. 4 is a block diagram of a portion of a system in accordance with an embodiment of the present invention.

Referring now to FIG. 4, shown is a block diagram of a portion of a system in accordance with one embodiment of the present invention. As shown in FIG. 4, system 700 includes multiple photodetectors and other circuitry to enable processing of the photodetector outputs. Specifically, system 700 includes a dual photodetector according to the present invention formed by a pair of photodiodes D1 and D2. In the embodiment shown in FIG. 4, photodetector D1 may be a shallow photodetector configured to have a peak spectral response in the visible light spectrum, while photodetector D2 may be a deep photodetector configured to have a peak spectral response in the near infrared light spectrum. As seen, the cathodes of the photodetectors are commonly coupled at a node C that further couples to a pair of switches S1 and S2. By control of these switches S1 and S2, a selected one of the photodiode outputs can be provided to a multiplexer 710 to provide a photodetector current output $I_{PD}$ corresponding to either D1 or D2 to the ADC input. As further seen, a bias voltage node $V_b$ may, when switch S2 is closed, provide a predetermined bias voltage to node C. As discussed further below in one particular embodiment this bias voltage may be set at about 0.4 V, although the scope of the present invention is not limited in this regard. When switch S1 is open and S2 is closed, the photodetector D1 current is coupled via multiplexer 710 to the ADC 720, while in turn when switch S1 is closed and S2 is open, the photodetector D2 current is coupled via multiplexer 710 to the ADC 720.

Thus when an infrared measurement is to be made via deep photodetector D2, switch S1 is closed and S2 is opened. Accordingly, a positive current $I_{PD}$ is provided to multiplexer 710 and in turn can be coupled through to an ADC 720, which may be a bipolar-input ADC. That is, ADC 720 may be configured to handle both polarities of photodetector currents. Instead when a visible measurement is to be made via shallow photodetector D1, switch S2 is closed and S1 is opened so that a negative current $-I_{PD}$ is provided through multiplexer 710 and to ADC 720. As described further below, in some embodiments ADC 720 may be configured as a sigma delta converter that provides a digitized output to a microcontroller unit (MCU) 730.

In various embodiments, MCU 730 may be configured to perform various processing on the incoming digitized signals, which may be representative of the visible and infrared photodetector outputs. In one particular embodiment, MCU 730 may perform method 500 of FIG. 3. At the conclusion of processing, the MCU may thus generate a lux value from which it may be determined the ambient light type based on the calculated lux value. In one embodiment, at a high level the lux value may be determined according to:

$$\text{lux}=a(D1-b*D2)$$

where a is a correction coefficient which may be determined as discussed above in FIG. 3; D1 is the visible photodetector output; D2 is the near infrared photodetector output; and b is a predetermined coefficient that operates to provide a weighted value of D2.

Figure 5:
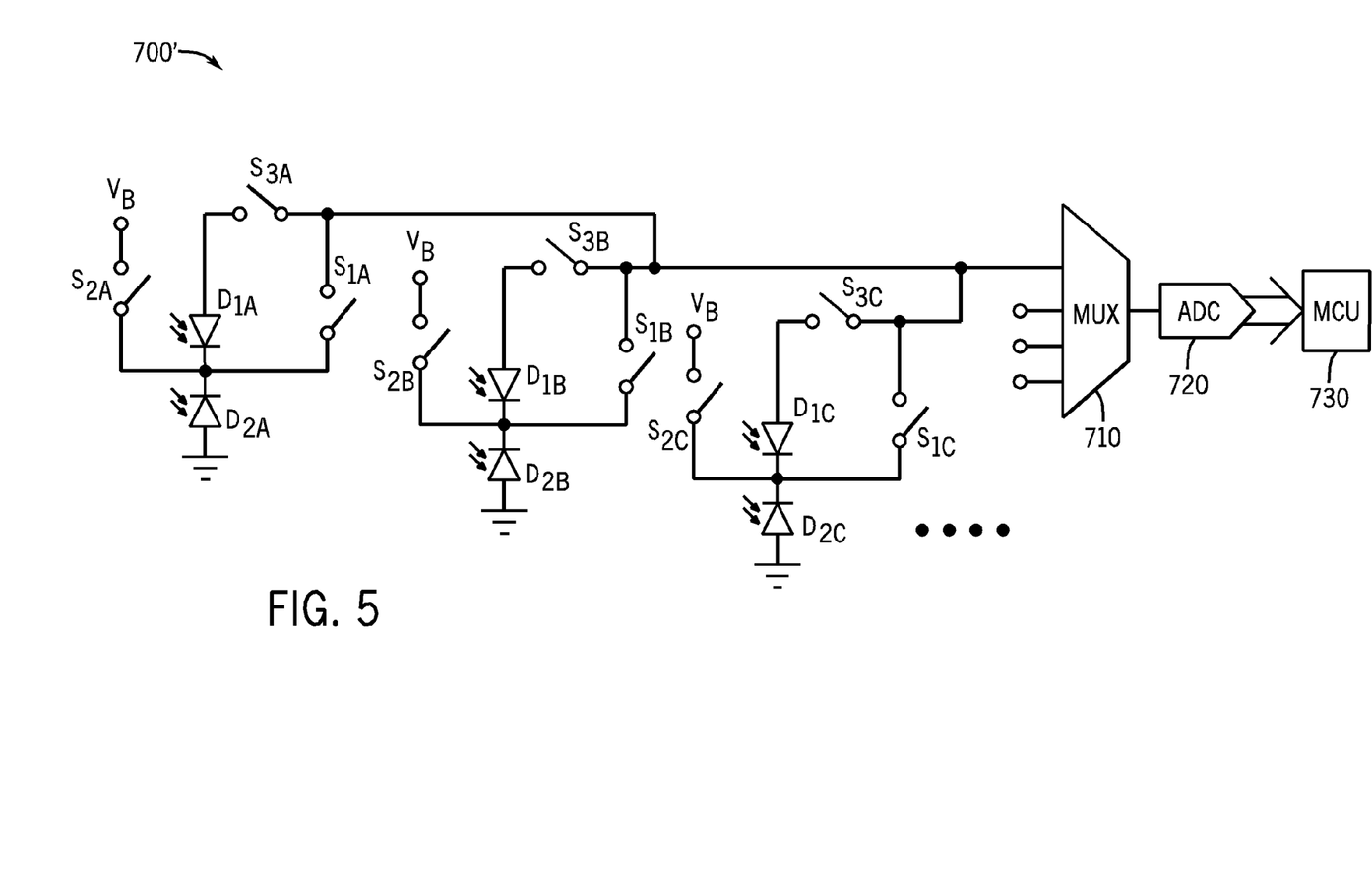
FIG. 5 is a block diagram of a system in accordance with another embodiment of the present invention.

While shown with this embodiment in FIG. 4, understand the scope of the present invention is not limited in this regard and other embodiments are possible. For example, referring now to FIG. 5, shown is a block diagram of a system 700' in which multiple dual photodetectors are provided. In the specific application of FIG. 5, three sets of dual photodetectors D1A/D2A-D1C/D2C are shown, in addition to multiple sets of switches for these corresponding dual photodetectors. Each dual photodetector may be individually enabled via control of a third switch S3A-S3C to selectively enable one of the dual photodetectors to provide a current output to multiplexer 710. Individual dual photodetectors may have different spectral responses, for example by depositing color filters above the corresponding dual photodetectors. Understand that further embodiments are possible. For example in other embodiments more than 3 dual photodetectors may be provided.

Exemplary embodiments use incremental delta sigma converters for this application. Such converters can be used to convert photodiode currents, in exemplary embodiments, since in delta sigma converters the first integrator input summing node operates in the current domain. The input photodiode can be coupled (or even directly connected in some embodiments) to the integrator input. The 1-bit DAC outputs an average current made up of oversample clock charges, which cancels the current from the photodiode. Typically, for discrete non-continuous measurements, the input is treated as a charge, which is the integral of the average current over the measurement integration period.

Figure 6:
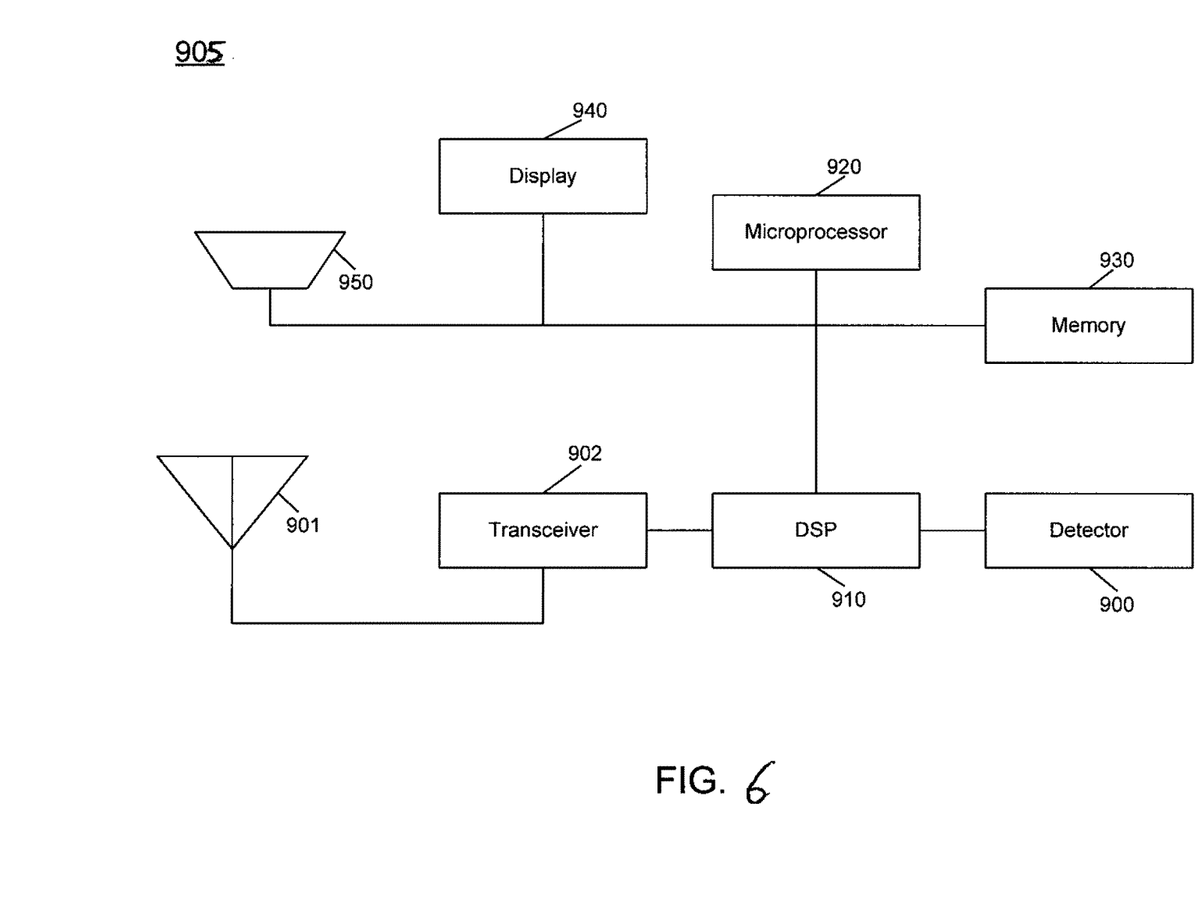
FIG. 6 is a block diagram of a system according to one embodiment of the present invention.

Referring now to FIG. 6, shown is a block diagram of a system 905, which may be a cellular telephone handset, personal digital assistant (PDA), or other such device in which a detector in accordance with an embodiment of the present invention is located. As shown, an antenna 901 may be coupled to a transceiver 902, which may transmit and receive radio frequency (RF) signals. In turn, transceiver 902 may be coupled to a digital signal processor (DSP) 910, which may handle processing of baseband communication signals. In turn, DSP 910 may be coupled to a microprocessor 920, such as a central processing unit (CPU) that may be used to control operation of system 905 and further handle processing of application programs, such as personal information management (PIM) programs, email client software, downloaded applications, and the like. Microprocessor 920 and DSP 910 may also be coupled to a memory 930. Memory 930 may include different memory components, such as a flash memory and a read only memory (ROM), although the scope of the present invention is not so limited.

Furthermore, as shown in FIG. 6, a display 940 may be present to provide display of information associated with telephone calls and application programs. Control of brightness of the display may be based on an ambient light detection and/or a proximity calculation performed based on information from a proximity detector 900, which may be a detector such as a sensor IC 40 including a dual photodetector structure in accordance with an embodiment of the present invention. Although the description makes reference to specific components of system 905, it is contemplated that numerous modifications and variations of the described and illustrated embodiments may be possible. For example, rather than using transceiver 902, depending on the desired application, in some embodiments one may use a receiver or a transmitter. Furthermore, transceiver 902 and/or DSP 910 may include an article in the form of a non-transitory machine-readable storage medium (or may be coupled to such an article, e.g., memory 930) onto which there are stored instructions and data that form software programs. The software programs may provide for control of transceiver 902, e.g., for controlling transmission of RF signals according to multiple communication protocols along one or more transmission paths, e.g., via control of which transmission path is selected and control of the selected transmission path (e.g., frequency, gain, timing and so forth) and non-selected path (e.g., via input of predetermined values). In addition, programs of DSP 910 may be used to control detector 900, and to enable determination of an ambient light type, illumination value, and detection of an object in proximity to system 905, such as a user. Based on the detection and illumination conditions, DSP 910 may control display 940 (e.g., to be brighter or darker) and a speaker 950 (e.g., to be louder or softer) accordingly.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a dual photodetector having a first photodetector configured for a visible light spectrum and a second photodetector configured for an infrared light spectrum, wherein the first and second photodetectors are coupled at a common node, and the first photodetector is stacked above the second photodetector;
a selector coupled to an output of the first and second photodetectors; and
an analog-to-digital converter (ADC) coupled to the selector and having a bipolar input to receive a current of a first polarity and a current of a second polarity from the selector, the current of the first polarity to be received from the second photodetector and the current of the second polarity to be received from the first photodetector.

2. The apparatus of claim 1, further comprising:
a first switch to switchably couple the common node to an input node coupled to the selector, and a second switch to switchably couple a bias voltage to the common node.

3. The apparatus of claim 2, wherein the first switch is controlled to be open and the second switch is controlled to be closed to provide the current of the second polarity provided by the first photodetector to the ADC.

4. The apparatus of claim 2, wherein the first switch is controlled to be closed and the second switch is controlled to be open to provide the current of the first polarity provided by the second photodetector to the ADC.

5. The apparatus of claim 1, wherein the first photodetector is formed as a diffusion of a first polarity above the second photodetector.

6. The apparatus of claim 5, wherein the second photodetector is formed at a junction of a well of a second polarity and a substrate of the first polarity.

7. A method comprising:
receiving a first output from a first photodetector configured for a visible light spectrum and a second output from a second photodetector configured for an infrared light spectrum;
calculating a first ratio between the first output and the second output;
calculating a second ratio between the first output and a difference corresponding to a flicker noise component obtained from the second output;
determining a contribution from multiple illumination types based at least in part on the first and second ratios; and
determining an ambient light type present in proximity to the first and second photodetectors using first and second correction coefficients and the first and second outputs.

8. The method of claim 7, further comprising:
receiving a third output from a third photodetector configured for the infrared light spectrum at a spectral difference from the second photodetector; and
calculating a third ratio between the first output and the third output.

9. The method of claim 8, further comprising determining the contribution from multiple illumination types further based the third ratio.

10. The method of claim 8, further comprising optical filtering of an input to the third photodetector to provide the spectral difference.

11. The method of claim 7, further comprising determining the contribution further based on an intensity of an illumination value determined using the first ratio.

12. The method of claim 7, including accessing a lookup table to obtain the first and second correction coefficients based on the determined contribution from the plurality of illumination types.

13. The method of claim 7, wherein determining the ambient light type includes calculating a photopic illumination value using the first and second correction coefficients and a difference between the first and second outputs and determining the ambient light type based at least in part on the photopic illumination value.

14. A portable device comprising:
a processor to perform application program instructions;
a transceiver to transmit and receive radio frequency (RF) signals;
a display to display information to a user;
a dual photodetector structure having a first photodetector to detect energy in a visible light spectrum, a second photodetector to detect energy in an infrared light spectrum, a switching circuit to control coupling of the first and second photodetectors to a selection circuit, and an analog-to-digital converter (ADC) coupled to the selection circuit to receive and convert a first current of a first polarity received from the second photodetector and a second current of a second polarity received from the first photodetector; and
a controller coupled to the dual photodetector structure to receive digitized information corresponding to the first and second currents and to determine an ambient light type based on a photopic illumination value calculated using at least one correction coefficient obtained based at least in part on the first and second currents.

15. The portable device of claim 14, wherein the controller is to calculate a first ratio between the first and second currents, calculate a second ratio between a difference between maximum and minimum samples of the first current, the difference corresponding to a flicker noise value, determine a contribution from multiple illumination types based at least in part on the first and second ratios, and obtain the at least one correction coefficient based on the determined contribution.

16. The portable device of claim 15, wherein the controller is to:
determine an initial photopic illumination value using the first ratio and initial correction coefficients obtained using the first ratio; and
obtain the at least one correction coefficient further based on the initial photopic illumination value.

17. The portable device of claim 16, wherein the switching circuit includes a first switch to switchably couple a common node between the first and second photodetectors to the selection circuit and a second switch to switchably couple a bias voltage to the common node.

18. The portable device of claim 17, wherein the first switch is controlled to be open and the second switch is controlled to be closed to provide the second current to the ADC, and the first switch is controlled to be closed and the second switch is controlled to be open to provide the first current to the ADC.

19. The portable device of claim 14, wherein the dual photodetector structure and the controller are formed on a single semiconductor die of an integrated circuit, and the first photodetector is formed above the second photodetector on a co-located portion of the single semiconductor die.

* * * * *